Patented May 15, 1945

2,375,978

UNITED STATES PATENT OFFICE 2,375,978

COMPOSITION AND COMPOUNDS UTILIZING THE SAME

John D. De Vine, Chicago, Ill.

No Drawing. Application March 17, 1941,
Serial No. 383,876

1 Claim. (Cl. 106—151)

This invention relates to chemical compositions and comprises particularly a new composition formed by the union of certain substances such as prolamins or proteins as, for instance, the product commonly known in commerce as zein, and an aldehyde as, for instance, furfural. My invention also includes other compounds or coating materials in which said new composition is utilized as one of the principal ingredients.

My new composition, together with compounds formed therefrom, may be adapted for various purposes, but are particularly applicable for use as coating compositions for coating paper, cloth, silk screens for printing, or any desired surfaces, and also as ingredients for inks.

One of the particular objects of this invention is the provision of a composition of the character indicated which will be substantially anhydrous and which may be made without the addition of water to the ingredients forming the composition.

It has heretofore been proposed to provide solutions of zein in suitable solvents. In such proposed solutions with which I am familiar, the zein is dissolved, for instance, in a solvent such as alcohol and is merely combined with the liquid in a physical solution without chemical change. Such a solution is more or less unstable, or at least is not stable for all temperatures or under all conditions, and may have other objectionable features.

As distinguished from such solutions, dispersions, or suspensions, I provide a new material or substance which consists in the reaction product resulting from the mixture of a prolamin such as zein with an aldehyde such as furfural, and other compositions utilizing such new material in combination with various suitable ingredients. As an example of my new product, I mix zein preferably in powdered form with a suitable amount of furfural to form a chemical union therewith, and produce a new reaction product. For instance, approximately 100 parts by weight of zein is treated with 30 parts by weight of furfural and preferably heated to approximately 130 degrees F. for expediting the chemical reaction. Stirring of the ingredients may also assist in carrying on such action. The product formed by such reaction is substantially a solid of granular appearance. This new chemical composition or product may be utilized for various purposes, but is preferably dissolved in an organic solvent for use in making film forming compositions or materials. This pre-treatment of the zein with furfural or the forming of such new composition permits the dissolving of the same in solvents that otherwise would not dissolve zein. For instance, this new composition is soluble in butanol or butyl alcohol which is not a solvent for zein.

This pre-treatment of zein with furfural also permits the same to be dissolved in a large number of other solvents such as ethyleneglycol monoethyl ether, ethyleneglycol monobutyl ether, and after such a solution is effected, it may then be combined in all proportions with a solution of nitro-cellulose dissolved in any of the above named solvents. This combination with nitro-cellulose makes a highly desirable film-forming composition with new and unusual properties which makes it adapted for making grease-proof coatings on paper, surface sealings on paper; adhesives, vehicles for silk screen paints, printing inks, and various other uses. When such a composition is to be formed with nitro-cellulose, it is desirable to incorporate a suitable plasticizer therein such as di-butyl tartrate. These ingredients may be mixed in any desired manner and solution will occur at room temperatures or preferably at somewhat higher temperatures. A desirable coating formed in this manner may be made of approximately the following ingredients in the parts noted.

| | Parts |
|---|---|
| New composition | 90 |
| Nitro-cellulose | 10 |
| Ethyleneglycol monoethyl ether | 245 |
| Butanol | 35 |
| Ethyleneglycol monobutyl ether | 70 |
| Plasticizer (optional) | 10 |

This coating material will have the desirable qualities above noted and may be used for a large variety of purposes.

Whereas those expert in this art have found that there is a known tendency for zein in solution to become gradually insoluble in character, it will be noted that solutions made by my new composition will be substantially stable and will not show such tendency.

From this description it will be seen that I have produced a new composition in which it is believed that there is an actual chemical change or an actual union of the zein with furfural, and that such new composition is adapted for use in producing various new and useful compounds of which the above example is illustrative. The particular coating material above described is also included in the scope of my invention as will appear from the following claim. My invention also includes the method of treatment of the zein in order to convert it to usable purposes as indicated.

I claim:

A film forming or coating composition formed of substantially the following ingredients in the proportions indicated:

| | Parts |
|---|---|
| A reaction product of zein and furfural | 90 |
| Nitro-cellulose | 10 |
| Ethyleneglycol monoethyl ether | 245 |
| Butanol | 35 |
| Ethyleneglycol monobutyl ether | 70 |
| Plasticizer (optional) | 10 |

JOHN D. DE VINE.